United States Patent [19]

Meyer

[11] Patent Number: 5,608,987
[45] Date of Patent: Mar. 11, 1997

[54] FLY AND INSECT TRAP

[76] Inventor: Frank Meyer, Box 4785, Williams Lake, British Columbia, Canada, V2G 2V8

[21] Appl. No.: 452,501
[22] Filed: May 30, 1995
[51] Int. Cl.⁶ .................................................. A01M 1/04
[52] U.S. Cl. ...................................................... 43/113
[58] Field of Search ..................................... 43/113, 114

[56] References Cited

U.S. PATENT DOCUMENTS

| | | | |
|---|---|---|---|
| 808,460 | 12/1905 | Laube | 43/113 |
| 1,126,958 | 2/1915 | Crownfield | 43/113 |
| 1,182,389 | 5/1916 | Levine | 43/113 |
| 1,564,976 | 12/1925 | Sauer | 43/113 |
| 1,655,540 | 1/1928 | Friedel | 43/113 |
| 1,713,557 | 5/1929 | Sauer | 43/113 |
| 1,820,813 | 8/1931 | Loomis | 43/113 |
| 2,791,864 | 5/1957 | Chappell | 43/113 |
| 3,820,273 | 9/1973 | Novak | 43/113 |
| 4,212,129 | 7/1980 | Shumate | 43/113 |
| 5,142,815 | 9/1992 | Birdsong | 43/113 |
| 5,365,690 | 11/1994 | Nelson et al. | 43/113 |

OTHER PUBLICATIONS

Popular Mechanics, Dec., 1938, p. 230.

Primary Examiner—Kurt Rowan
Attorney, Agent, or Firm—Brian M. Long

[57] ABSTRACT

A fly and insect trap for attachment to a depending light bulb has an enclosure of translucent material for installation around the light bulb, the enclosure having an upwardly open top defining an opening for receiving the bulb into the interior of the enclosure with the top spaced outwardly from the bulb to form therebetween an inlet gap for the entry of flies and insects into the interior of the enclosure. A retainer is secured to the enclosure within the enclosure and beneath the opening and resiliently engageable with the bulb for suspending the trap from the bulb.

3 Claims, 3 Drawing Sheets

5,608,987

FLY AND INSECT TRAP

BACKGROUND OF THE INVENTION

1. Field of the Invention

The present invention relates to fly and insect traps and, more particularly, to fly and insect traps for attachment to an existing light bulb.

2. Description of the Related Art

It is well known that flies and insects are attracted to light sources, and often become trapped in light shades or the like extending around illuminated light bulbs. In the past, various fly traps have been based on this knowledge and, more particularly, have employed a light bulb to attract flies and insects and an enclosure or a container of one type or another for collecting the thus-attracted flies and insects.

For example, U.S. Pat. No. 5,301,456, issued Apr. 12, 1994 to Luc Joban et al. discloses a portable luminous trap for flying or crawling insects having a fluorescent lamp in the centre of an insect ingress zone, with transparent baffles radiating outwardly from the lamp for stunning the insects and causing them to drop downwardly through a funnel opening into an entrapment container.

U.S. Pat. No. 5,142,815, issued Sep. 1, 1992 to Robert M. Birdsong discloses a night light insect trap having a housing which fits over a night light and having a window opening through which light from the night light passes, with a receptacle attached to the housing below a cover on the window, the receptacle holding a substance to which insects adhere. With this arrangement, when insects are attracted to the light from the night light, they jump or fly onto the window cover, become stunned and fall into the receptacle, where they become trapped in the substance in the receptacle.

U.S. Pat. No. 3,820,273, issued Jun. 28, 1974 to John Novak discloses a fly and insect trap having a cylindrical body with a conical cover closing the top of the body and a conical bottom closing the bottom of the body. The bottom has an opening at an apex portion thereof through which flies and insects can enter the body, being attracted by a bait or an electric light suspended within the body, which then traps the flies and insects within the body.

BRIEF SUMMARY OF THE INVENTION

According to the present invention, a fly and insect trap for attachment to a depending light bulb comprises an enclosure of translucent material for installation around the light bulb, the enclosure having a bottom, a side wall extending upwardly from the bottom and an upwardly open top defining an opening for receiving the bulb into the interior of the enclosure with the top spaced outwardly from the bulb to form therebetween an inlet gap for the entry of flies and insects into the interior of the enclosure. A retainer is secured to the enclosure within the enclosure and beneath the opening, and is resiliently engageable with the bulb for suspending the trap from the bulb.

The present trap has the advantage that it can be removably secured, in a very simple manner, to the light bulb. The heat from the bulb can then readily escape upwardly through the opening in the top of the enclosure, to the exterior of the enclosure, thus avoiding excessive heat build-up within the interior of the enclosure.

The flies and insects, being attracted by light emanating from the light bulb and passing outwardly through the translucent material of the enclosure, can enter the enclosure through the opening in the top of the enclosure. Having thus arrived into the interior of the enclosure, the flies and insects are dehydrated by the heat of the light bulb, and drop downwardly from the light bulb onto the bottom of the enclosure, from which they can be collected periodically. To facilitate such collection, the bottom of the enclosure is preferably separate from and removably attachable to the side wall of the enclosure. Also, a sheet of material having an upwardly facing adhesive surface may be placed on the bottom for trapping the flies and insects.

Since the bulb can be inserted into the interior of the enclosure through the open top thereof, and thus brought into resilient engagement with the retainer for suspending the trap from the bulb, the present trap can easily be attached to and removed from any depending bulb, whether the bulb is fitted into a socket fixedly attached to a ceiling, beam or other support or whether the bulb is suspended from a cord.

In the preferred embodiment of the invention, the retainer is formed by prongs which are parts of an array of wires bent into supporting engagement with the side wall, so that the wires serve to shape and support the enclosure and, also, to releasibly secure the entire trap to the light bulb.

BRIEF DESCRIPTION OF THE DRAWINGS

Further features, objects and advantages of the present invention will be more readily apparent from the following description when taken in conjunction with: the accompanying drawings, in which.

DESCRIPTION OF THE PREFERRED EMBODIMENT

Figure 1:
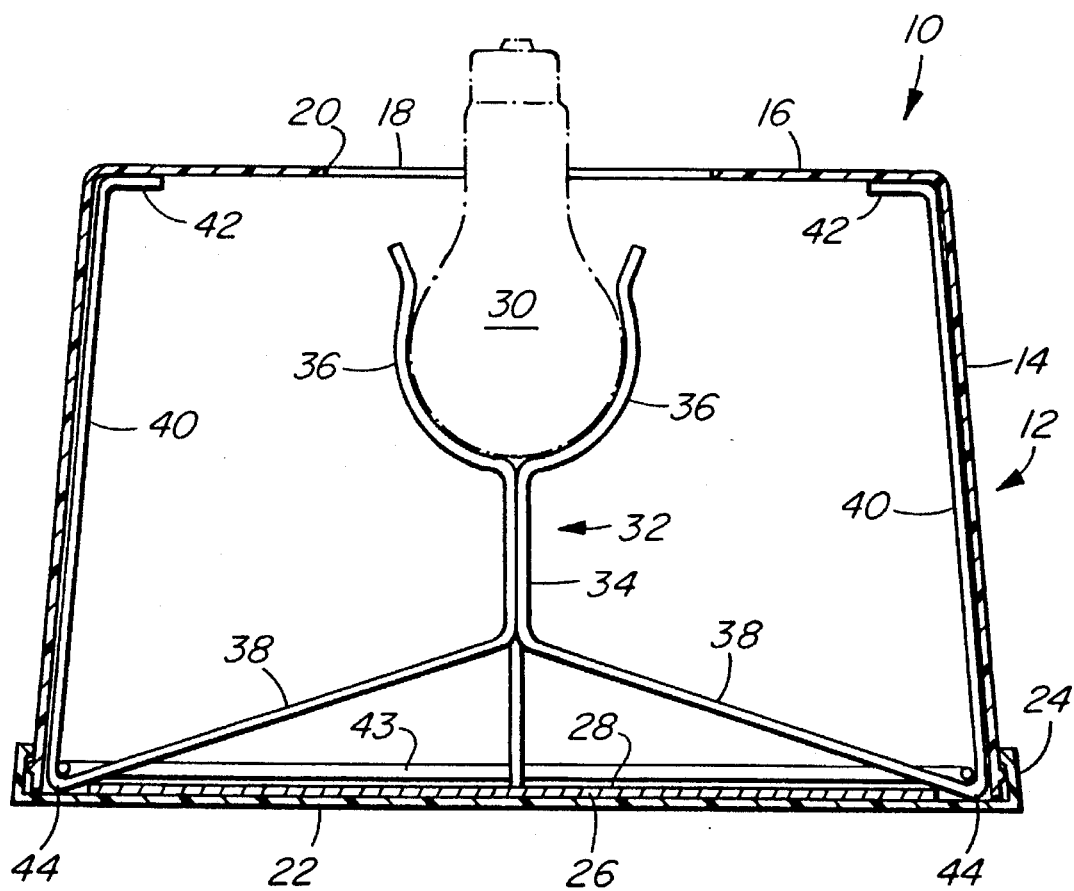
FIG. 1 shows a view, taken in vertical cross-section along the line 1—1 of FIG. 3, through a fly and insect trap according to the present invention.
Figure 2:
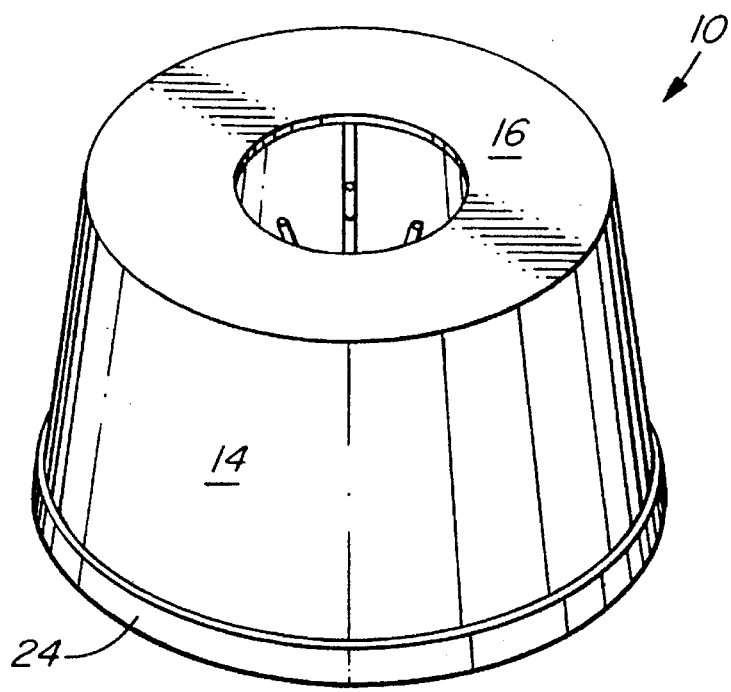
FIG. 2 shows a view in perspective of the trap of FIG. 1.
Figure 3:
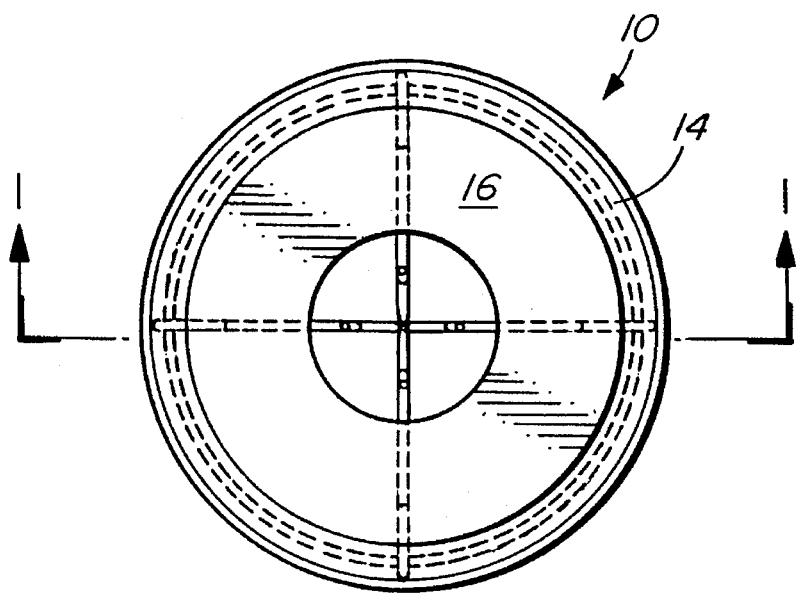
FIG. 3 shows a plan view of the trap of FIGS. 1 and 2.
Figure 4:
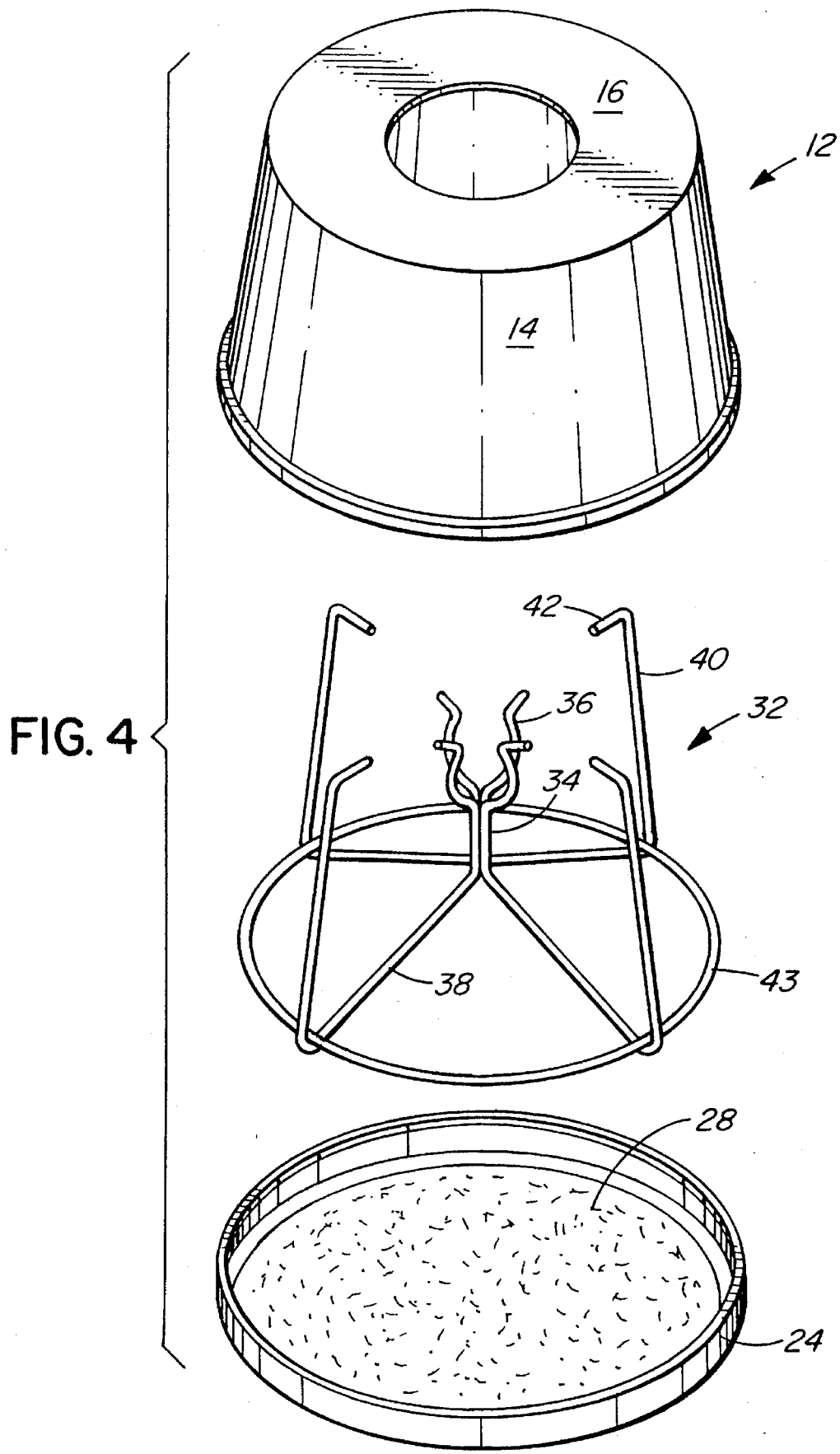
FIG. 4 shows an exploded view in perspective of the trap of FIGS. 1 to 3.

In the accompanying drawings, reference numeral 10 indicates generally a fly and insect trap according to the present invention.

The trap 10 comprises an enclosure, indicated generally by reference numeral 12, which is made of translucent moulded plastic material, and which has a downwardly divergent frusto-conical side wall 14 extending to an annular top 16, which extends radially inwardly from the side wall 14 and defines in the top of the enclosure a central circular opening 18, having a circular edge 20.

The enclosure 12 is provided with a circular bottom 22, which is formed at its periphery with an upstanding flange 24 which resiliently engages the bottom edge of the enclosure side wall 14 for releasibly securing the bottom 22 to the side wall 14.

On top of the bottom 22 within the enclosure 12, there is provided a circular sheet of material 26 which has, on its top surface, a layer of adhesive 28 providing an upwardly directed adhesive surface.

The enclosure 12 is releasibly secured to a light bulb 30 by means of a retainer indicated generally by reference numeral 32. The retainer 32 is formed of a frame comprising four wires which are connected together by soldering at vertically upwardly extending central portions 34 of the wires. Above these vertical portions 34, the wires are bent to form an upwardly open array of four prongs 36, which resiliently receive and engage the light bulb 30 therebetween.

The wires also include downwardly and radially outwardly inclined portions 38 which are spaced upwardly from the enclosure bottom 22 and which extend to upwardly extending portions 40, located adjacent and in supporting relationship with the side wall 14 of the enclosure 12. At the tops of the portions 40 are bent inwardly to provide support portions 42 which underlay and support the top 16 of the enclosure 12. A wire ring 43 is brased to bends 44 between the inclined portions 38 and the upwardly extending portions 40. Alternatively, the wire ring 43 may be welded or otherwise secured to the bends 44.

In use, the above-described trap 10 can readily be pushed upwardly towards the light bulb 30 so that the bulb 30 passes through the opening 18 and becomes resiliently engaged between the prongs 36. The prongs 36 then support the trap 10 from the light bulb 30. When the light bulb 30 is illuminated, light from the light bulb 30 passes outwardly through the side wall 14 and the top 16 of the enclosure 12 and, thus, serves to attracts flies and insects. Meanwhile, heat from the light bulb 30 can readily escape upwardly through the opening 18. The flies and insects which are attracted to the light bulb 30 pass downwardly through the opening 18 into the interior of the enclosure 12, where they become stunned by impact against light bulb 30 and the inner surface of the enclosure 12, and also dehydrated by the heat from the light bulb 30. This causes the flies and insects to drop to the bottom of the enclosure 12, when they become trapped by the adhesive surface 28.

The bottom 22 can readily be periodically removed from the remainder of the enclosure 12 for the purpose of removal of the trapped flies and insects by removal and replacement of the adhesive sheet 26.

As will be readily apparent to those skilled in the art, various modifications may be made in the above-described invention within the scope of the appended claims. The size of the opening in the enclosure should, however, be sufficient for the flies and insects to enter and for the heat to escape, and also the bottom should preferably be removable to facilitate cleaning. The adhesive layer 28 may be omitted, in which case the sheet material 26 may be impregnated with an insecticide. A design and/or wording may be printed on the enclosure 12.

I claim:

1. A fly and insect trap for attachment to a depending light bulb, comprising:

an enclosure of translucent plastic material for installation around the light bulb;

said enclosure having an upwardly open annular top defining an opening for receiving the bulb into the interior of said enclosure with said top spaced outwardly from the bulb to form therebetween an inlet gap the entry of flies and insects into the interior of said enclosure, a downwardly divergent frusto-conical side wall and a bottom separate from said side wall and releasably engageable with said side wall; and an array of wires;

said wires forming a plurality of prongs distributed in an upwardly open array;

said prongs being resiliently deflectable outwardly of said army for sprung engagement with the bulb; and said wires including upwardly extending portions adjacent and in supporting relationship with said side wall and support portions underlying and supporting said annular top of said enclosure.

2. A fly and insect trap as claimed in claim 1, wherein said wires include vertical portions extending downwardly from said prongs and downwardly and radially outwardly inclined portions spaced upwardly from said bottom of said enclosure and extending from said vertical portions to said upwardly extending portions.

3. A fly and insect trap as claimed in claim 1, wherein said side wall has a bottom edge and said bottom has a peripheral upstanding flange resiliently engaged with said bottom edge for releasably securing said bottom to said side wail.

* * * * *